Aug. 18, 1936.      W. J. BORST      2,051,071
SICKLE GRINDER
Filed May 14, 1934      4 Sheets-Sheet 1

WITNESS.
Edward Melin.

INVENTOR
Walter J. Borst.
BY Brown, Jackson, Boettcher & Dienner
ATTORNEYS.

Aug. 18, 1936.  W. J. BORST  2,051,071

SICKLE GRINDER

Filed May 14, 1934   4 Sheets-Sheet 4

INVENTOR.
Walter J. Borst,
BY Brown, Jackson, Boettcher & Dienner,
ATTORNEYS.

Patented Aug. 18, 1936

2,051,071

UNITED STATES PATENT OFFICE 2,051,071

SICKLE GRINDER

Walter J. Borst, Moline, Ill., assignor to Deere & Company, Moline, Ill., a corporation of Illinois Application May 14, 1934, Serial No. 725,468

13 Claims. (Cl. 51—56)

The present invention relates to grinders and more particularly has to do with grinders adapted for grinding sickles such as are used on mowing machines, grain harvesters, and like implements.

As is well known, sickle bars of this general type comprise what is ordinarily termed a knife back along the length of which are suitably secured a plurality of knife sections of approximately triangular configuration with two sides converging forwardly and beveled to form cutting edges, and while grinding apparatus adapted especially for grinding such beveled converging cutting edges have been on the market and in use for some time, so far as I am aware they have proved unsatisfactory, primarily because with such grinding apparatus it is difficult or impossible to obtain a straight cutting edge of the proper bevel.

The principal object of the invention is to provide a grinding apparatus for sickle bars and the like by which the original shearing angle of the several knife sections can be reproduced every time the sickle is reground. Another important object of the present invention is the provision of a grinding apparatus for sickle bars and the like by which the original bevel of the several knife sections can be reproduced every time the sickle is reground.

Another important object of the invention is to provide a grinding apparatus for sickle bars and the like by which both the original bevel and the original shearing angle of the several knife sections can be reproduced every time the sickle is reground.

Another object of the invention is to provide an apparatus of this type in which the holder for the sickle bar and the support for the grinding tool are so arranged with respect to each other as to dispose the cutting face of the grinding tool in a plane parallel with the plane of the beveled surface to be ground, and providing for movement of the grinding tool relative to the sickle transversely thereof in a direction parallel with the cutting edge of the knife section to be ground.

A further object of the invention is to provide a grinding apparatus in which the grinding tool is mounted for vertical movement and for fore and aft movement, and wherein two supports are provided for the sickle so positioned relative to the grinding tool that one of them disposes the sickle with one of the beveled surfaces of the knife sections in a plane parallel to the cutting face of the grinding wheel and the other disposes the opposite beveled surfaces of the knife sections in a plane parallel to the cutting face of the grinding tool.

A still further object of the invention is to provide a grinding apparatus having a support for the sickle and wherein the grinding tool is mounted on supporting means which can be shifted to dispose the cutting edge of the grinding tool in a plane parallel with either beveled surface of the knife sections of the sickle.

A still further object of the invention is to provide a grinding apparatus for sickles which can be readily mounted on a horizontal support such as a bench, on a wall or other vertical support, or upon one of the supporting wheels of a mowing machine or other implement.

Other objects and advantageous features of the present invention will be apparent from the following description of the preferred embodiments of the invention taken in connection with the accompanying drawings in which.

Figures 1, 5, 6:
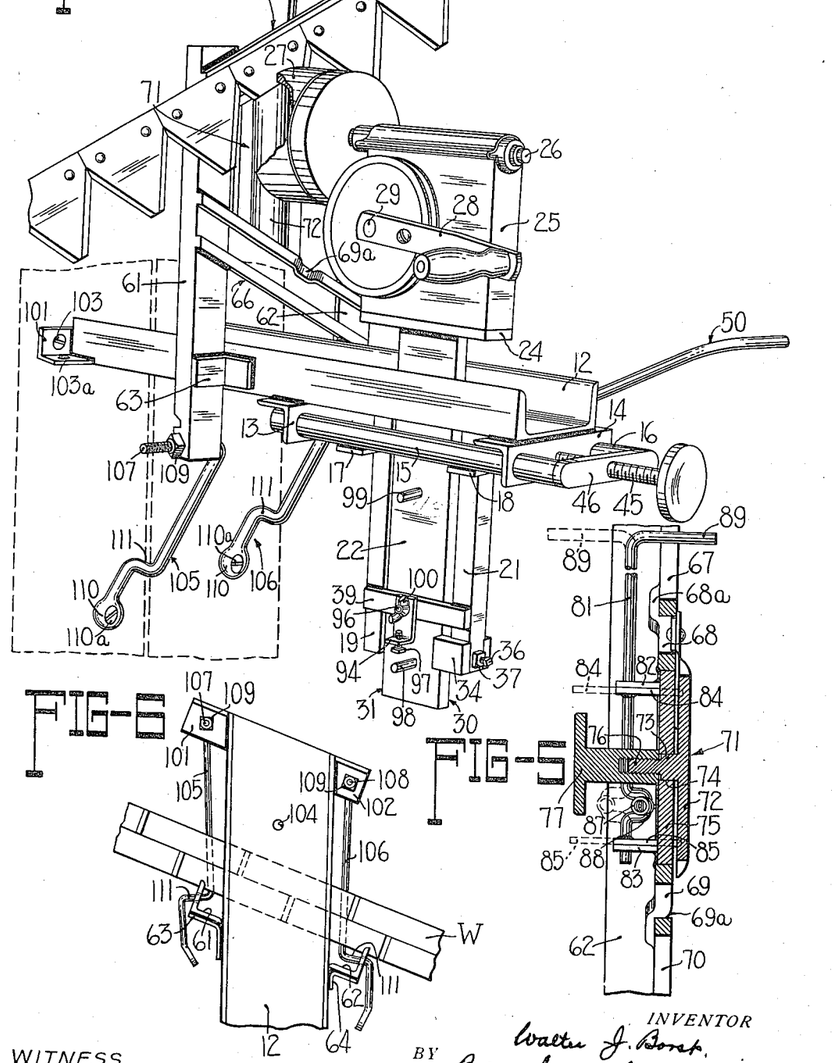
Figure 1 is a perspective view of the improved grinding apparatus secured to a suitable vertical support and having a sickle supported thereon in position to be ground.
Figure 5 is a vertical cross sectional view taken on the plane of the line 5—5 of Figure 2, looking in the direction of the arrows and illustrating the locking means for securing the sickle to be ground on the apparatus in either of its alternative positions.
Figure 6 is a top plan view, partly broken away, and illustrating the means for securing the main supporting frame of the apparatus on a mower wheel.
Figures 2, 3, 4:
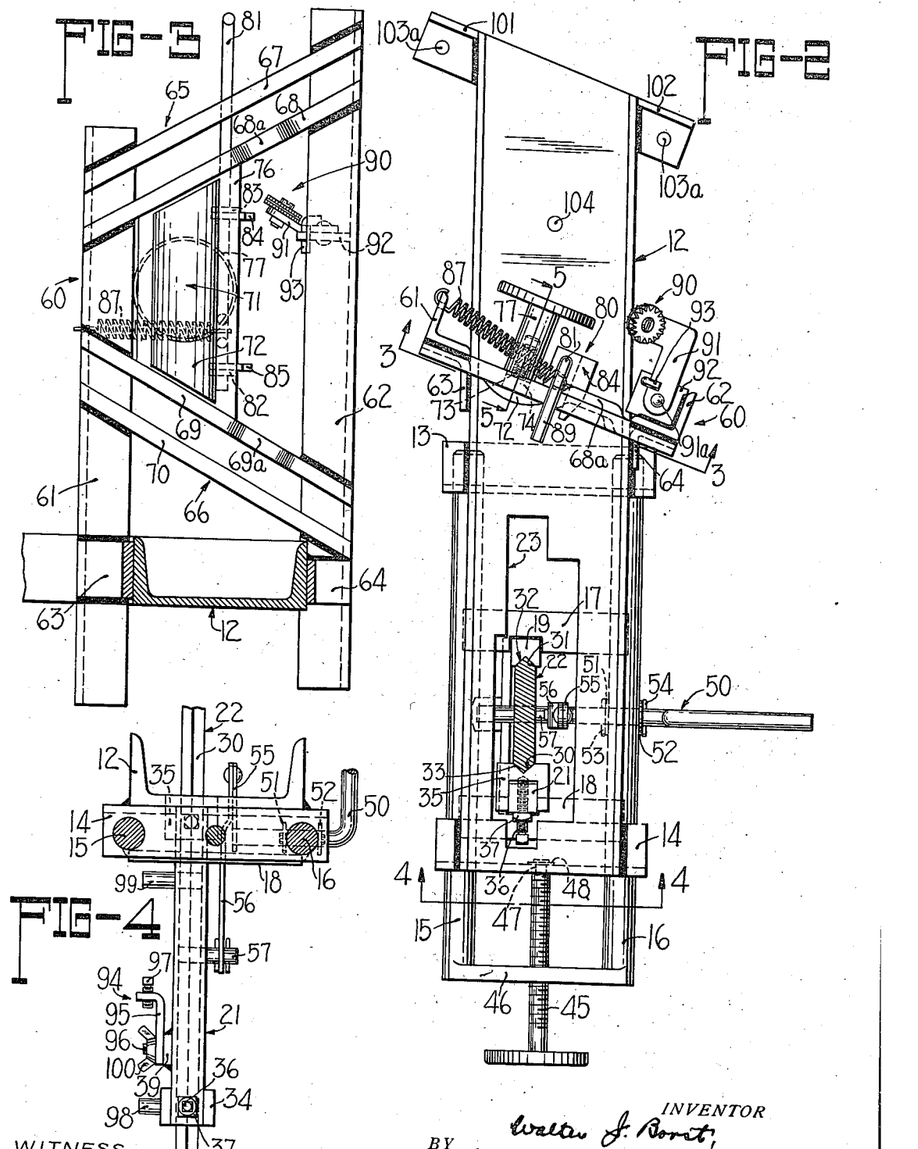
Figure 2 is a top plan view of the apparatus shown in Figure 1 with the sickle and the grinding wheel and driving mechanism therefor removed, and illustrating the grinding mechanism supporting member in section.
Figure 3 is a vertical cross sectional view taken on the plane of the line 3—3 of Figure 2 looking in the direction of the arrows.
Figure 4 is a vertical cross sectional view taken on the plane of the line 4—4 of Figure 2 looking in the direction of the arrows.

Referring to Figures 1 to 6 of the drawings, which illustrate the preferred embodiment of the invention, the main supporting frame of the grinding apparatus comprises a longitudinally extending horizontally disposed channel member 12 to the underside of which the horizontally disposed flanges of two longitudinally spaced transversely disposed angle members 13 and 14 are welded. The vertically extending flange of each of the angle members 13 and 14 is provided with a pair of transversely spaced perforations. The pairs of perforations are in alignment with each other and slidably receive two longitudinally extending bars 15 and 16 of circular cross section, to the undersides of which, between the angle members 13 and 14, are welded two longitudinally spaced cross members 17 and 18. Welded at their upper ends to and extending downwardly from the cross members 17 and 18 are two bars or members 19 and 21, respectively, and a standard 22 is disposed between said bars 19 and 21 for vertical movement relative thereto. The standard 22 extends upwardly through a slot 23 provided in the main frame member 12, as shown in Figure 2, and has welded or otherwise suitably secured to its upper end a longitudinally extending base plate or member 24 upon which is mounted a housing 25. Journaled in suitable bearings provided in the upper end of the housing 25 is a longitudinally extending shaft 26, the rear end of which extends outwardly some distance from the housing and has rigidly secured thereon so as to rotate therewith a grinding tool in the form of a cup-shaped grinding wheel 27. The shaft 26 is adapted to be rotated at high speed, through suitable gearing enclosed in the housing 25, by means of a hand crank 28 fixed to a transverse shaft 29 journaled in suitable bearings in the housing. The gearing may be of any suitable type, such as a worm on the shaft 26 engaging with a worm wheel on the shaft 29, as will be readily appreciated. If desired, an electric motor may be substituted for the hand operated driving mechanism, and in such a structure the grinding wheel 27 would preferably be fixed directly to the armature shaft of the motor and the motor would be suitably mounted on the base plate 24. However, any means desired may be provided for rotating the shaft 26.

As shown in Figure 2, the front and rear edges 30 and 31 of the standard 22 are V-shaped, the rear edge 31 being slidably disposed in a V-shaped recess 32 formed in the forward side of the supporting member 19, while the front edge 30 engages in a V-shaped recess 33 provided in each of two vertically spaced guide members or blocks 34 and 35 separately carried by the supporting member 21 at opposite ends thereof, respectively. Each of the blocks 34 and 35 is notched out on one side so that it embraces the member 21 and is supported on the end of a screw 36 which extends through a threaded perforation provided therefor in the member 21. As will be readily understood, by turning the screws 36 the space between the blocks 34 and 35 and the supporting member 21 may be increased or decreased as desired. The screws 36 can be locked in any position of adjustment by means of lock nuts 37 as will be readily apparent. The downwardly extending members 19 and 21 are tied together adjacent their lower ends by means of a strap 39 which is welded or otherwise suitably secured to the two members. The members 19 and 21 thus provide supporting members or tracks in which the standard 22 is adapted to be moved vertically in the operation of the grinding apparatus as will be hereinafter described.

The supporting members or bars 19 and 21, the cross members 17 and 18, and the longitudinally extending bars 15 and 16 constitute a carriage which can be moved longitudinally relatively to the main frame member 12 by means of an adjusting screw 45 threaded in a threaded perforation in a cross member 46 which ties the two longitudinally extending bars 15 and 16 together at their forward ends, as shown in Figures 1 and 2. The screw 45 is provided with a reduced portion at its forward end which is journaled in a suitable perforation 47 provided therefor in the vertical flange of the transverse angle member 14, the screw being held against longitudinal movement relative to the member 14 by means of a washer 48 fixed in any suitable manner to the end of the screw on the inner side of the angle member 14, as shown in Figure 2. It will thus be seen that by turning the screw 45 in the appropriate direction the carriage may be adjusted longitudinally along the channel 12 relative to the sickle supporting apparatus to move the grinding wheel supported by the carriage into or out of grinding engagement with the sickle supported on the apparatus as will be hereinafter described.

As in the grinding operation it is necessary that the grinding wheel be moved vertically along the beveled cutting edge being ground, means is provided for moving the standard 22 vertically relatively to the longitudinally movable carriage just described. This means is best shown in Figures 2 and 4 and comprises a crank 50 journaled in a perforation provided in the longitudinally extending bar 16 of the carriage and held in position relative to the bar by means of two washers 51 and 52 which are disposed on opposite sides of the bar 16 and held in place by means of cotter pins 53 and 54, respectively. Fixed to the end of the crank 50 on the inner side of the bar 16 is an arm 55 having its outer end pivotally connected to a link 56 which in turn is pivotally connected with a lug 57 suitably fixed to and projecting laterally from the standard 22. By turning the crank 50 in its bearing in the bar 16 the standard may be moved upwardly, and in Figures 2 and 4 the several parts comprising the means for moving the standard vertically are shown in the positions they occupy when the standard is in its uppermost position.

Coming now to the means for supporting the sickle to be ground, suitable framework, indicated as an entirety by the numeral 60, is provided for supporting the sickle in either of two positions. In one position the sickle is so held that one of the beveled surfaces of the several knife sections will be disposed in a plane parallel to the cutting surface of the grinding wheel, and in the other position the sickle is so held that the opposite beveled surfaces of the several knife sections will be disposed in a plane parallel to the cutting face of the grinding wheel. This framework 60 comprises two vertically extending frame bars or uprights 61 and 62 suitably secured near their lower ends to the two side flanges respectively of the longitudinal channel member 12, as by means of angle brackets 63 and 64 welded or otherwise suitably secured to the vertical frame bars 61 and 62 and to the flanges of the member 12, as shown in Figures 1, 2, and 3.

Carried by the vertical bars 61 and 62, as shown in Figures 1 and 3, are two guide means indicated in their entireties by the reference numerals 65 and 66, respectively, and each guide means is adapted to receive the sickle in one of the two positions above mentioned. The guide means 65 comprises two spaced bars 67 and 68 disposed parallel to each other and inclined downwardly to the left as viewed in Figure 3, said bars being welded or otherwise suitably secured at their ends to the uprights 61 and 62, respectively. The two bars 67 and 68 are spaced apart a distance approximately equal to the width of the knife back of the sickle so as to receive and support the latter between them. The guide 66 is inclined upwardly to the left as viewed in Figure 3 and comprises two parallel bars 69 and 70 welded or otherwise suitably secured at their ends to the uprights 61 and 62, respectively, and spaced apart similarly to the bars 67 and 68.

A suitable clamping device, indicated in its entirety by the numeral 71, is provided for securely holding the sickle in either of the two guides 65 or 66. This clamping device comprises a plate 72 extending vertically between the guides 65 and 66, as best shown in Figures 3 and 5. The plate 72 has a lug 73 of square cross section formed integral therewith on its rear side (see Figure 5), which lug projects through a square perforation 74 in a stationary plate 75 extending between and having its opposite ends suitably fixed to the bars 68 and 69 of the guides 65 and 66, respectively. The lug 73 terminates outwardly in a screw threaded portion 76 that threads into an internally threaded boring in an adjusting member 77. When the sickle is to be ground, the clamping plate 72 may be moved outwardly by turning the adjusting member 77 in the proper direction so that the knife sections of the sickle when placed in one or the other of the guides 65, 66 are received between the plate 72 and the stationary plate 75. The sickle is then moved lengthwise in the guide until the knife section to be ground is received in the proper position between the ends of the plate 72 and the plate 75, after which the adjusting member 77 is again tightened up to securely clamp the sickle in place, as will be readily understood.

In order to position the sickle in either of the guides 65 or 66 so that the knife section to be ground will be disposed properly with respect to the grinding wheel, a suitable gauge device, indicated in its entirety by the numeral 80, has been provided. This gauge device comprises a rod 81 journaled in suitable perforations provided in brackets 82 and 83 secured in any suitable manner, as by welding, to the rear side of the stationary plate 75, as shown in Figure 5. The rod 81 is provided with two laterally extending fingers 84 and 85 fixed thereto in any suitable manner, said fingers being positioned adjacent the guides 65 and 66, respectively, and when the rod 81 is rotated to the position shown in Figure 2 the fingers project forwardly beyond the plate 75. The sickle is then moved along the guide in which it is carried until the beveled edge to be ground contacts the finger 84 or 85 as the case may be, depending on which guide the sickle is carried by, after which the sickle is clamped in position by means of the adjusting member 77 as above described. The rod is then rotated back in its bearings to the dotted line position shown in Figure 5 so that the fingers will not interfere with the operation of the grinding wheel. A spring 87 (see Figure 2) has been provided for holding the rod in either of its two positions of adjustment. This spring 87 is anchored at one end in a perforation provided in the upright 61, as shown in Figure 2, and has its opposite end connected in any suitable manner to a crank portion 88 formed in the rod 81 adjacent its lower end, as shown in Figure 5. The rod 81 is also provided with a bent portion 89 at its upper end to facilitate rotation thereof in the adjusting operation.

A dressing tool 90 is rotatably mounted on an arm 91 which in turn is pivotally mounted at 91a on a bracket 92 welded or otherwise suitably fixed to the upright member 62 between the guides 65 and 66 as shown in Figure 3. The dressing tool 90 is normally held in an inoperative position by a pin 93 which is disposed in a perforation in the bracket 92, the outer end of the pin being bent at right angles and extending over the arm 91, thereby preventing said arm from swinging inwardly on its pivot as shown in Figure 2. Whenever it is desired to dress the grinding wheel, the pin 93 may be withdrawn and the dressing tool swung on its pivot 91a inwardly and forwardly through the space between the stationary vertical plate 76 and the upright 62 (see Figure 3) to position it in operative relation with the grinding wheel. The dressing tool may then be locked in operating position to dress the grinding wheel by replacing the pin 93 in the perforation in the bracket 92 where it will contact the opposite edge of the arm 91.

The uprights 61 and 62 fixed to the main frame member 12 as previously described are so positioned angularly with respect thereto (see Figure 2), and the bars 67 and 68 of the guide 65 are supported on the uprights 61 and 62 at a certain predetermined angle of inclination relative to the frame member 12 (see Figure 3), that when the sickle is supported in the upper guide 65 with the knife sections pointing downwardly as shown in Figure 1, the beveled surfaces on the right hand side of each of the knife sections as viewed in the latter figure will be disposed in planes parallel to the cutting face of the grinding wheel 27 and the cutting edge of each of these beveled surfaces will be disposed parallel with the path of movement of the grinding wheel occasioned by the manipulation of the crank 50 operatively connected with the standard 22 that supports the grinding wheel 27 as above described, this path of movement of the grinding wheel 27 being a vertical one in the illustrated construction. The guide 66 is supported on the uprights 61 and 62 at a certain predetermined angle of inclination relative to the frame member 12 (see Figure 3) that when the sickle is supported in the lower guide 66 with the knife sections pointing upwardly, the beveled surfaces on the opposite sides of the several knife sections will be disposed in the same relation relative to the grinding wheel, as will be readily apparent.

In order to obtain this positioning of the guides 65 and 66, the two uprights 61 and 62 have been fixedly connected to the vertical flanges of the main frame member 12 in such positions that the front faces of said uprights to which the guides 65 and 66 are fixed lie in a plane which makes an angle with respect to the direction of movement of the carriage, by which the grinding wheel is moved longitudinally with respect to the main frame member 12, which is equal to 90° minus the angle of bevel of the cutting edges of the knife sections. The guides 65 and 66 are positioned on the uprights 61 and 62 at an angle relative to the direction of movement of the standard 22, which direction of movement is a vertical one when the apparatus is set up as shown in the drawings, which is equal to the angle the cutting edges of the knife sections make with the longitudinal axis of the knife back.

With the uprights 61 and 62 and the guides 65 and 66 disposed in the fixed positions as above described, when the sickle is clamped in either the guide 65 or the guide 66, it is merely necessary to bring the grinding wheel 27 into grinding engagement with the beveled edge of the knife section to be ground, which is quickly accomplished by turning the adjusting screw 45. The beveled edge of the knife may then be ground by rotating the grinding wheel and at the same time manipulating the crank 50 to move the grinding wheel vertically. Since the grinding face of the wheel 27 is in the same plane with the beveled edge to be ground, the same bevel is reproduced by the grinding wheel each time the sickle is sharpened, and the angular relations between the uprights 61 and 62, the channel 12, and the guides 65 and 66 correspond to and serve to maintain the cutting edges of the knives the same as the bevel originally provided on the knife sections. In this connection it is to be noted also that the movement of the grinding wheel longitudinally through the operation of the screw 45 is in a direction perpendicular to the plane of the beveled surface being ground, and, therefore, regardless of how much of the knife section need be ground away to provide a proper cutting edge, the resulting bevel will always be at the same angle as the original bevel. It is to be noted further that by the use of the apparatus just described not only is the same bevel of the knife sections reproduced each time the sickle is reground, but also the original shearing angle between the two cutting edges of each section is also retained, which is an important feature of the present invention. In order to assure that the grinding wheel will not strike the guide bars 68 or 69 of the guides 65 and 66, respectively, during the grinding operation, said bars have been notched out as shown at 68a and 69a, respectively (see Figure 3).

It is, of course, desirable to limit the upward movement of the grinding wheel so that it cannot be moved beyond the base end of the beveled portion of the knife section, and for that purpose a suitable stop, indicated in its entirety by the reference numeral 94, has been provided as shown in Figures 1 and 4. This stop 94 comprises an angle bracket 95 supported by means of a screw 96 upon the cross member 39 that ties the two vertically extending bars 19 and 21 together near their lower ends as before described. A cap screw 97 is threaded into the horizontally extending flange of the bracket 95 so as to extend vertically. When the stop 94 is disposed in the position shown in Figure 1, the cap screw 97 is adapted to contact with a stop pin 98 carried by the standard 22 so as to limit the upward vertical movement of the standard relative to its supporting carriage, and the stop pin 98 is disposed in such a position on the standard that when the standard 22 is moved upwardly by manipulating the crank 50 the cap screw contacting with the stop pin 98 permits the grinding wheel 27 carried at the upper end of the standard 22 to be moved vertically only as far as the upper end of the beveled edge of the knife section being ground when the sickle is disposed in the upper guide 65, but not beyond this point, as will be readily understood.

As it is of course also desirable to limit the downward movement of the grinding wheel beyond a point coinciding with the base end of the bevel of the knife section being ground when the sickle is disposed in the lower guide 66, the bracket 95 has been pivotally supported on the screw 96 so that it can be rotated through an angle of 180° to the position shown in Figure 4, so that the cap screw 97 carried by the bracket will cooperate with another stop pin 99 carried by the standard 22 and positioned an appreciable distance above the stop pin 98, as shown in Figures 1 and 4. The stop pin 99 is so positioned on the standard 22 that when the cap screw comes into contact with the pin upon downward movement of the standard the grinding wheel will have reached a point coinciding with the base or inner end of the bevel of the knife section being operated upon. The bracket 95 may be locked in either of its adjusted positions by a wing nut 100 threaded on the outer end of the screw 96.

The apparatus may be secured to a wall or other vertical support, and to this end, as illustrated in Figure 1 of the drawings, a pair of angle brackets 101 and 102 are fixedly secured to the rear end of the main frame member 12, by welding or in any other suitable manner, one adjacent each of the vertical flanges of said member 12 as shown in Figures 1 and 2, and the vertical flanges of the angle brackets 101 and 102 are provided with suitable holes for the reception of screws 103 (see bracket 101 in Figure 1) for supporting the rear end of the frame member 12 on a wall. A pair of suitable brackets 105 and 106 are provided for supporting the intermediate portion of the apparatus, and the brackets 105 and 106 are provided at their upper ends as shown in Figure 1 with laterally bent threaded ends 107 and 108, respectively, adapted to be inserted in perforations provided therefor in the lower extended ends of the uprights 61 and 62, respectively, and receive nuts 109 for securing the brackets in said uprights. The opposite ends of the brackets 105 and 106 are formed to provide eyes 110 for the reception of screws 110a for attaching said brackets to a wall or other vertical support. As shown in Figure 2, the rear end of the frame member 12 is cut at an angle and the brackets 101 and 102 are disposed at the same angle, said angle being equal to the angle at which the uprights 61 and 62 are fixed to the frame member 12, whereby when the sickle is supported in either of the guides 65 or 66 it will be in a position parallel to the wall or other vertical support upon which the grinding apparatus is mounted.

In addition to being adapted to be mounted on a wall or other suitable vertically extending support as illustrated in Figure 1, the grinding apparatus of the present invention is also adapted to be mounted on a bench, or on one of the supporting wheels of a mower or other implement as illustrated in Figure 6.

To mount the apparatus on a bench or other horizontally disposed support, the horizontally extending flanges of the brackets 101 and 102 are each provided with a hole 103a for the reception of a screw or bolt. A hole 104 is also provided in the horizontal portion of the main frame member 12 for the reception of a screw or bolt, as shown in Figure 2.

The brackets 105 and 106 are of a particular configuration as shown in Figures 1 and 6 so as to also adapt them for use in clamping the grinding apparatus on the wheel W of a mower or other implement as shown in Figure 6. Each of the brackets 105 and 106 is provided with an offset portion 111, and this offset portion is spaced from the threaded bent end a distance equal to the distance between the angle bracket 101 or 102 and its associated upright 61 or 62. When it is desired to mount the grinding apparatus on the implement wheel W the brackets 105 and 106 are inserted in the perforations in the lower ends of the uprights 61 and 62 up to the offset portions 111, as shown in Figure 6, with the shank portions of the brackets extending under the rim of the wheel. The threaded bent ends 107 and 108 of the brackets are then inserted in the holes 103a in the horizontally extending flanges of the brackets 101 and 102 respectively, and the nuts 109 are then placed on the threaded ends of said brackets. Tightening the nuts 109 on the threaded ends of the rods will securely clamp the rim of the mower wheel in between the brackets 105 and 106 and the bottom of the main frame member 12, as shown in Figure 6.

Figures 9, 11:
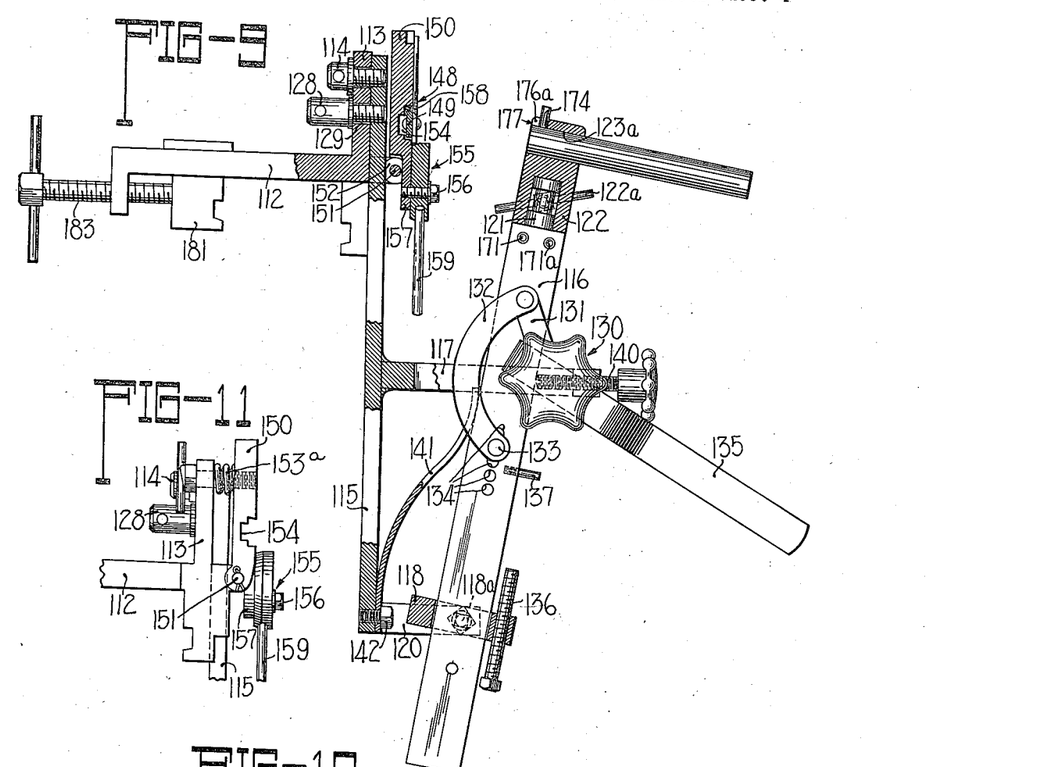
Figure 9 is a vertical cross sectional view through the apparatus shown in Figures 7 and 8 taken approximately on the plane of the line 9—9 of Figure 7, with certain parts removed and other parts being shown in elevation.
Figure 11 is an end view of certain of the parts, and illustrating the means for adjusting the pivotally mounted guide plate, which supports the sickle during the grinding operation, relative to the base member of the apparatus.

A modified form of the grinding apparatus of the present invention has been illustrated in Figures 7 to 11, and as there shown the main frame member of the apparatus is in the form of a suitable horizontally extending base plate 112 provided with a vertically extending plate 113 adjacent one end which is formed integral with or rigidly connected to the base plate 112. Pivotally connected to the vertical plate 113 on a horizontal pivot pin 114 and extending downwardly therefrom, as shown in Figure 9, is a supporting bar or member 115, and suitably supported by the bar 115 for substantially vertical movement relative thereto is a standard 116, said standard being slidably mounted in upper and lower guides 117 and 118, respectively, carried by the bar 115. The lower guide 118 is pivotally mounted on pivot bolts 118a between arms 119 and 120 fixed to and extending forwardly from the lower end of the supporting bar 115 (see Figures 8 and 9). The upper guide 117 is formed integral with or suitably fixed to and extends forwardly from the supporting bar 115 at a point substantially intermediate the ends of said bar.

As shown in Figure 9 a pivot stud 121 is provided on the upper end of the standard 116, and pivotally mounted on said stud is a head 122 which may be locked in any position of adjustment on the stud by means of a set screw 122a threaded through a suitable perforation provided therefor in the head 122 and adapted to be turned to bind against the stud 121.

Figures 7, 8:
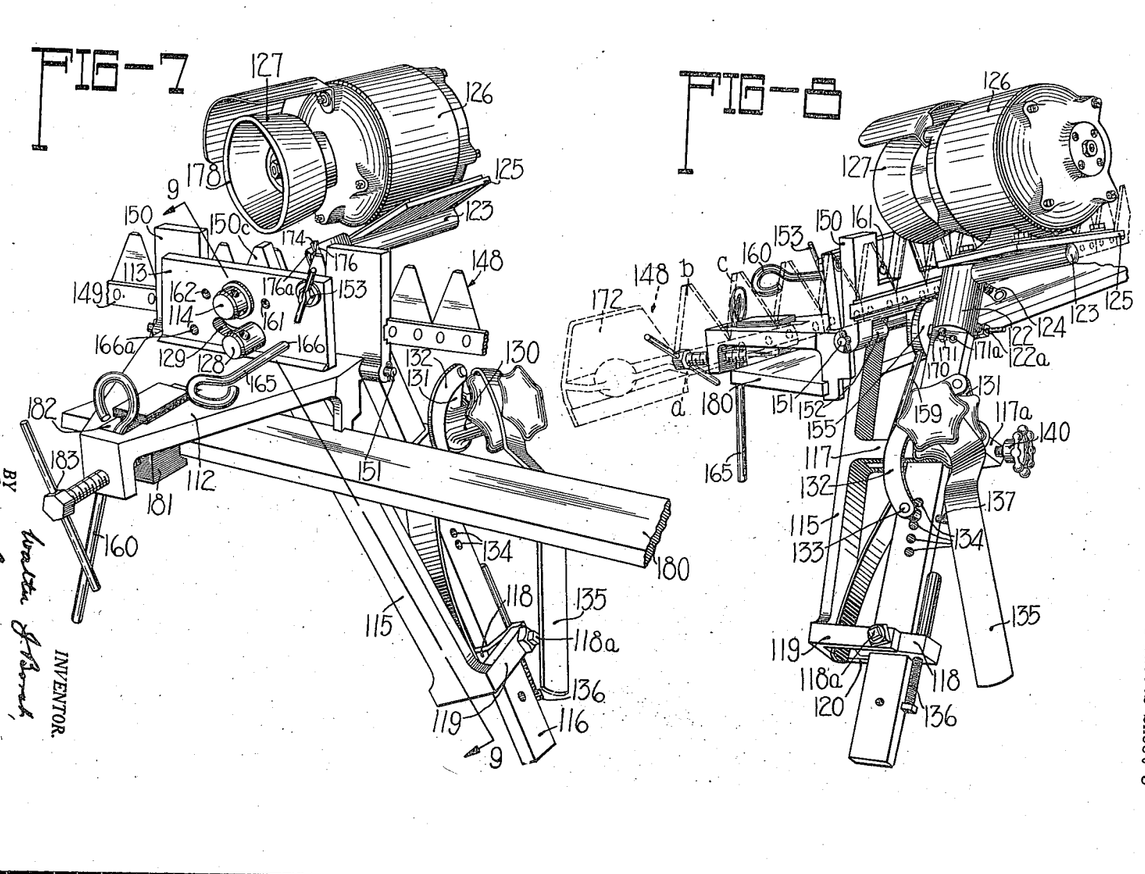
Figure 7 is a perspective view of a modified form of apparatus as viewed from the rear.
Figure 8 is a a perspective view of the apparatus shown in Figure 7 as viewed from the front.

Rockably mounted in the upper end of the head 122 is a supporting bar or member 123 which is of circular cross section and extends through a boring 123a provided therefor in the head 122, as shown in Figure 9. The supporting bar 123 may be locked in any position of adjustment in the head 122 by means of a set screw 124, see Figure 8, which is threaded through a suitable perforation provided in the head 122 and is adapted to be turned to bind against the bar 123 to lock the latter against rocking in the head 122. Fixed to the upper side of the supporting bar 123 in any suitable manner is a base plate 125 which supports an electric motor 126. The motor may be rigidly secured to the base plate 125 in any suitable manner, as by being bolted thereto as shown in Figure 8. Mounted directly on the armature shaft of the electric motor is a cup-shaped grinding wheel 127.

Means is provided for limiting the swinging movement of the supporting bar 115 about its horizontal pivotal support 114 on the vertical plate 113, and such means, as shown in Figures 7 and 9, comprises a clamping screw or member 128 which projects through an arcuate shaped slot 129 (Figure 7) in the vertical plate 113 and is threaded into a perforation provided therefor in the supporting bar 115. The supporting bar 115 may thus be swung about its pivotal support 114 within the limits of the slot 129, and may be clamped in any position of adjustment by means of the clamping member 128.

Suitable mechanism is provided for moving the standard 116 up and down in the guides 117 and 118 relatively to the supporting bar 115 so as to move the grinding wheel vertically during the grinding operation, and this mechanism includes a member 130 pivotally mounted on the outer end of the guide 117 and provided with a radially extending arm 131 to the outer end of which is pivoted one end of an arcuate shaped link 132, the opposite end of said link being connected to a pin 133 supported in one of a plurality of vertically spaced holes 134 provided in the standard 116 below the member 130, as shown in Figures 8 and 9. An arm 135 is clamped on the outer end of the member 130, through which arm the latter may be rotated. Rotating the member 130 by swinging the arm 135 moves the standard 116 up and down in the guides 117 and 118, thus similarly moving the grinding wheel carried at the upper end of the standard. For limiting the downward movement of the grinding wheel an adjustable stop 136 has been provided which stop is carried by the guide 118 and extends parallel to the standard 116 in close proximity at the front side thereof as shown in Figures 8 and 9. This stop 136 is adapted to cooperate with a lug 137 carried by the standard 116 some distance above the stop 136. As will be readily understood, the downward movement of the standard 116 may be varied within certain limits by means of the adjustable stop member 136, and the extent of the upward movement of the standard 116 is determined by the particular hole 134 in which the pin 133 is inserted.

For moving the grinding wheel 127 longitudinally of the base plate 112 into and out of operative grinding position, suitable mechanism has been provided. This mechanism includes an adjusting screw 140 threaded through a perforation provided in a cross member 117a at the outer end of the guide 117 interconnecting the forward ends of the two spaced arms of the upper guide 117, the inner end of said screw contacting with the forward side of the standard 116. By turning this adjusting screw 140, the standard 116 may be adjusted toward or from the supporting bar 115, thus moving the grinding wheel carried at the upper end of the standard toward or from the sickle to be ground, the sickle being supported on the apparatus between the supporting bar and the standard, as will be hereinafter described. In this adjustment of the standard the lower standard guide 118 swings on the pivot bolts 118a. A retaining spring 141 is provided for holding the standard 116 against the end of the adjusting screw 140, the lower end of the spring being secured to the supporting bar 115 by means of a screw 142 as shown in Figure 9.

In the modified construction the sickle to be ground is indicated by the reference numeral 148, and it is supported on the outer face of a guide plate 150 pivotally mounted on a rod 151 supported in perforations in trunnions 152 extending outwardly from the forward lower edge of the base plate 112. The guide plate 150 is adapted to be rocked about the pivot rod 151 and held in any position of adjustment thereon by means of an adjusting screw 153 journaled in a perforation adjacent the upper right hand corner of the vertical plate 113, as shown in Figure 7, and threaded into a perforation in the plate 150 as shown in Figure 11. A compression spring 153a is disposed on the adjusting screw 153 between the plates 113 and 150 and acts to force the guide plate 150 away from the plate 113.

Figure 10:
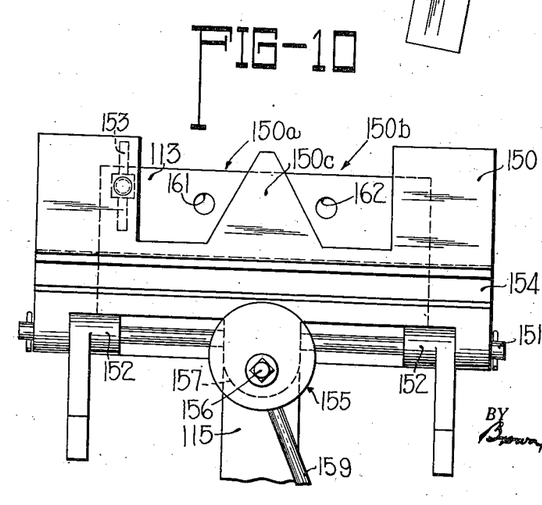
Figure 10 is a front elevational view of the pivotally mounted sickle supporting member and the means for locking the sickle in said member.

A longitudinally extending recess or slot 154 is provided in the guide plate 150 to accommodate the knife back 149 of the sickle, as shown in Figures 9, 10, and 11. The plate 150, as shown in Figure 10, is notched out at 150a and 150b to provide a substantially triangular shaped portion 150c against which the knife section to be ground is adapted to rest during the grinding operation. Suitable clamping means is provided for holding the sickle on the guide plate 150 in any adjusted position thereon, and such means comprises a pivoted clamping member 155 eccentrically mounted by means of a pivot bolt 156 on a lug 157 depending downwardly from the central portion of the plate 150 (see Figure 10). By rotating the clamping member 155 in the proper direction it will apply upward pressure against the lower edge of the sickle and thereby lock the upper edge of the knife back 149 against the upper undercut wall 158 of the recess 154 as shown in Figure 9. An operating handle 159 is provided for rotating the clamping member 155.

It is, of course, necessary to properly position the sickle before it is clamped to the plate 150 as above described, and for this purpose suitable gauging means have been provided in the form of a pin 160 (see Figure 8) which is adapted to be inserted through either of the holes 161 or 162 provided in the upright plate 113 on the opposite sides of the supporting bar pivot 114 as shown in Figure 7.

When it is desired to grind the left hand beveled edges of the several knife sections, in which position the grinding apparatus is set as shown in Figures 7 and 8, the pin 160 is inserted through the hole 161 so that its end projects beyond the plate 150. The sickle is then moved longitudinally in the slot 154 until the edge of the knife section to be ground comes into contact with the end of the pin 160, and then the sickle is clamped in position and the pin 160 removed.

The laterally swingable supporting bar 115 which supports the vertically movable grinding wheel standard 116 is now locked, by means of the clamping screw 128 hereinbefore described, in the proper position to dispose the grinding wheel so that it will operate to grind the left hand edges of the knife sections, which is the position shown in Figures 7 and 8. This position is determined by a gauge pin 165 (Figure 7) disposed in a hole 166 in the vertical plate 113 and projecting therethrough into contact with the left hand edge of the supporting bar. This positions the supporting bar 115 so that the direction of movement of the standard 116 is approximately parallel with the cutting edge of the knife section to be ground. The grinding wheel must then be properly positioned on the standard 116, and this is accomplished by rotating the head 122 on the pivot stud 121 until a lug 170 projecting downwardly from the head 122 comes into contact with a stop member or lug 171 provided on the standard 116 as shown in Figure 8, after which the head 122 is locked in such position by means of the set screw 122a above mentioned.

The pivotally mounted plate 150 on the front face of which the sickle is securely clamped by the eccentric clamp 155 is now tilted by means of the adjusting screw 153 to such a position that when the grinding wheel 127 is moved longitudinally and brought into grinding engagement with the bevel surface of the knife section to be ground, which is accomplished by turning the screw 140 as above described, the same amount will be ground off throughout the length of the bevel surface. In this connection attention is called to the fact that the lug 170 on the head 122, the stop 171 on the standard 116 that cooperates with the lug 170, and the hole 166 in the vertical plate 113 are so located that when the sickle is tilted forwardly by tilting the plate 150 as above mentioned, the plane of the grinding edge 178 of the grinding wheel 127 will lie in a plane parallel with the plane of the beveled surface being ground, and the direction of movement of the standard 116 is parallel to the cutting edge being ground.

After all of the above mentioned adjustments have been properly made, manipulation of the lever 135 will move the standard 116 vertically and thereby move the grinding wheel up and down along the edge of the knife section to be ground, and at each vertical movement of the grinding wheel a uniform amount will be ground off along the full length of the cutting edge. The amount of cut of the grinding wheel will be controlled by the screw 140, as will be readily understood, and this grinding operation will reproduce identically the original bevel on the knife section. As the pivot 118a for the lower guide 118 of the standard 116 is disposed relatively remote from the grinding wheel, movement of the adjusting screw 140 alone moves the grinding wheel to and from the sickle with substantially parallel movement, and as a result it is unnecessary to change the tilt of the plate 150 after it has once been set for grinding a particular sickle.

As previously mentioned the downward movement of the standard 116 is limited by the adjustable stop 136 and stop pin 137, and its upward movement is limited by the pin 133 being inserted in one of the holes 134 provided therefor in the standard, and therefore the stop 136 is set in such a position that the lug 137 will strike the upper end of the stop 136 at the time the grinding wheel reaches the bottom of the beveled edge being ground, and the pin 133 will be disposed in that one of the holes 134 which will give sufficient movement to the grinding wheel in an upward direction that it will clear the tips of the knife sections in the grinding operation.

After the left hand edge of the first knife section has been ground, the eccentric clamping member 155 is swung to inoperative position to release the sickle and the sickle is then shifted longitudinally along the slot 154 the distance of one knife section, the proper position being again gauged by the pin 160 being inserted through the perforation 161 and the next knife section to be ground being brought into contact with the end of the pin. The sickle is then again clamped in position and the edge of the second knife section ground, the procedure being repeated until the left hand edges of all of the knife sections of the sickle have been ground.

In order to properly position the grinding wheel 127 for grinding the opposite edges of the knife sections, which would be the right hand edges as viewed in Figure 8, the clamping screw 128 is loosened and the supporting bar 115 is rotated about its pivot 114 into its alternative position. This position is determined by the pin 165 being projected through a perforation 166a in the vertical plate 113, and the supporting bar 115 is brought into contact with the end of the pin 165 projecting through the plate after which the supporting bar is locked in such position by tightening the clamping screw 128. The head 122 at the upper end of the standard 116 is then rotated on its pivot stud 121 toward the right as viewed in Figure 8 to position the stop lug 170 in contact with a stop pin 171a carried by the standard as shown in said figure. This will properly position the grinding wheel for grinding the opposite edge of each of the knife sections of the sickle. It is then only necessary to reverse the sickle end for end in the guide 159, properly position the first knife section to be ground by means of the gauge pin 160 and proceed with the grinding operation as above described. In this modified construction also the original shearing angle between the two cutting edges of each knife section is retained.

In Figure 8 the sickle is shown in dotted lines supported on the apparatus in position for grinding, and as illustrated it comprises not only the knife sections and knife back above referred to, but also the usual knife head which is indicated by the numeral 172. This knife head includes a shank portion or outwardly extending flange *a* which as shown extends across the base portions of the two knife sections *b* and *c* adjacent the knife head. Owing to the presence of this shank portion *a*, it is not possible to grind the knife sections *b* and *c* completely down to the bottom of the cutting edge because of interference by the shank *a* with the grinding wheel, and, therefore, the rocking adjustment of the grinding wheel support 123 in the head 122 above mentioned has been provided whereby it is possible to grind the sections *b* and *c* down nearer to the bottom of the cutting edges than would otherwise be possible. When grinding the left hand edges of the sections *b* and *c*, the support 123 is rocked counterclockwise as viewed in Figure 8 until a lug 174 fixed on the inner end of the support 123 as shown in Figure 9 is brought to bear against the side 176 of a slot 177 provided in the upper end of the head 122. The rocking of the support 123 to this position brings the point of contact between the beveled edge of the knife section being ground and the grinding wheel nearer to the bottom of the wheel, and permits grinding down closer to the shank *a* of the knife head before the wheel will strike such shank *a*. When grinding the right hand edges of the knife sections *b* and *c*, the base 125 is rocked in the opposite direction in the head 122 to a position determined by the lug 174 bearing against the opposite side 176a of the slot 177, as will be readily understood.

When grinding all other knife sections of the sickle except the sections *a* and *b* adjacent the knife head as above described, the support 123 is locked in a mid-position,—that is to say, the position in which the grinding wheel operates most nearly cross-wise of the beveled edges, which position permits grinding down to substantially the bottom of the cutting edge without striking the adjacent cutting edge of the next section.

In connection with the rocking adjustment movements of the support 123 above described, it is to be noted that since such movements are about an axis perpendicular to the plane of the grinding face of the wheel, such adjustments do not alter the parallel relationship between the grinding face and the beveled surface to be ground.

As best shown in Figure 7, the base plate or member 112 is adapted to be clamped to the rim of a mower wheel or other suitable fixed object 180 by means of a clamping device comprising a block 181 adjusted lengthwise in a slot 182 in the base plate 112 by an adjusting screw 183.

I claim:

1. A grinding apparatus for grinding sickles having a plurality of similar knife sections with forwardly converging beveled sides forming cutting edges, said apparatus comprising a frame, a carriage movable relative to said frame, a grinding wheel, a guide along which the sickle may be moved longitudinally to selectively dispose each knife section thereof in a position to be operated upon by the grinding wheel, means for locking the sickle in any adjusted position in said guide, means for supporting said grinding wheel on said carriage to dispose the face thereof in a plane parallel with the plane of one of the beveled surfaces on the knife sections, and means for moving said supporting means in a path parallel with the cutting edge of said one beveled surface, said last named means comprising a member journaled in said carriage, an arm fixed to and extending radially from said member, and a link pivotally connected at one end with said arm and at its other end with said supporting means.

2. A grinding apparatus for grinding sickles having a plurality of similar knife sections with forwardly converging beveled sides forming cutting edges, said apparatus comprising a grinding wheel, a guide along which the sickle may be moved longitudinally to selectively dispose each knife section thereof in a position to be operated upon by said grinding wheel, a supporting member mounted for swinging movement relative to said guide, a standard mounted on said supporting member for swinging movement about an axis extending at right angles to the pivot axis of said supporting member and movable longitudinally relatively to said member, a base upon which said grinding wheel is mounted, said base being mounted upon the upper end of said standard for rocking movement about an axis perpendicular to the swinging axis of said member, the extent of the swinging movement of said member and of the rocking movement of said base being such that said grinding wheel may be positioned to dispose the working face thereof in a plane parallel to the plane of either beveled surface of the knife sections of the sickle, means for swinging said standard relative to said supporting member for moving the grinding wheel into grinding engagement with the beveled surface to be ground, and means for moving said standard longitudinally of itself in said supporting member to move the grinding wheel along the surface to be ground.

3. A grinding apparatus for grinding sickles having a plurality of similar knife sections with forwardly converging beveled sides forming cutting edges, said apparatus comprising a grinding wheel, a guide along which the sickle may be moved longitudinally to selectively dispose each knife section thereof in a position to be operated upon by said grinding wheel, a supporting member mounted for swinging movement relative to said guide, a standard mounted on said member for swinging movement about an axis extending at right angles to the pivot axis of said supporting member and movable longitudinally relatively to said member, the extent of said swinging movement being such that said member may be swung to a position in which the direction of longitudinal movement of said standard is parallel to either cutting edge of the knife sections, a base upon which said grinding wheel is mounted, said base being mounted upon the upper end of said standard for rocking movement about an axis parallel with the direction of longitudinal movement of said standard, the extent of said rocking movement being such that the working face of said grinding wheel may be brought into a plane parallel with the plane of the beveled surface of the knife sections in either position of said member, means for swinging said standard relative to said supporting member for moving the grinding wheel into grinding engagement with the beveled surface to be ground, and means for moving said standard longitudinally in said supporting member to move the grinding wheel longitudinally along the surface to be ground.

4. A grinding apparatus for grinding sickles having a plurality of similar knife sections with forwardly converging beveled sides forming cutting edges, said apparatus comprising a grinding wheel, a guide along which the sickle may be moved longitudinally to selectively dispose each knife section thereof in a position to be operated upon by said grinding wheel, gauge means for determining the proper grinding position of each knife section on said guide, a supporting member mounted for swinging movement relative to said guide, a standard mounted on said supporting member for swinging movement about an axis extending at right angles to the pivot axis of said supporting member and movable longitudinally relatively to said member, a base upon which said grinding wheel is mounted, said base being mounted upon the upper end of said standard for rocking movement about an axis perpendicular to the swinging axis of said supporting member, the extent of the swinging movement of said supporting member and of the rocking movement of said base being such that said grinding wheel may be positioned to dispose the working face thereof in a plane parallel to the plane of either beveled surface of the knife sections of the sickle, means for swinging said standard relative to said supporting member for moving the grinding wheel into grinding engagement with the beveled surface to be ground, and means for moving said standard longitudinally in said supporting member to move the grinding wheel longitudinally along the surface to be ground.

5. A grinding apparatus for grinding sickles having a plurality of similar knife sections with forwardly converging beveled sides forming cutting edges, said apparatus comprising a grinding wheel, a guide along which the sickle may be moved longitudinally to selectively dispose each knife section thereof in a position to be operated upon by said grinding wheel, gauge means for determining the proper grinding position of each knife section on said guide, means associated with said guide for locking said sickle in any adjusted position on said guide, a supporting member mounted for swinging movement relative to said guide, a standard mounted on said supporting member for swinging movement about an axis extending at right angles to the pivot axis of said supporting member and movable longitudinally relatively to said member, a base upon which said grinding wheel is mounted, said base being mounted upon said standard for rocking movement about an axis perpendicular to the swinging axis of said member, the extent of swinging movement of said member and of the rocking movement of said base being such that said grinding wheel may be positioned to dispose the working face thereof in a plane parallel to the plane of either beveled surface of the knife sections of the sickle, means for swinging said standard relative to said supporting member for moving the grinding wheel into grinding engagement with the beveled surface to be ground, and means for moving said standard longitudinally in said supporting member to move the grinding wheel longitudinally along the surface to be ground.

6. A grinding apparatus for grinding sickles having a knife head, a knife back extending laterally from one side of said knife head, a plurality of similar knife sections fixed to said knife back and having forwardly converging beveled sides forming cutting edges, and a shank member extending across said knife head and along said knife back adjacent certain of said knife sections, said grinding apparatus comprising a grinding wheel, a guide along which the sickle may be moved longitudinally to selectively dispose each knife section thereof in a position to be operated upon by said grinding wheel, means for supporting said grinding wheel and movable into either of two alternative positions to dispose the working face of the grinding wheel in a plane parallel to the plane of either beveled surface of the knife sections of the sickle, said means comprising a swinging member, a standard carried thereby for longitudinal movement with respect thereto, and a base mounted upon said standard for rocking movement about an axis perpendicular to the swinging axis of said member, and means providing for rocking of the grinding wheel relative to said base to dispose the point of contact between the grinding wheel and the beveled surface being ground near the bottom of the grinding wheel, whereby said grinding wheel may operate close to the shank of the sickle before striking the same.

7. A grinding apparatus for grinding sickles having a plurality of similar knife sections with forwardly converging beveled sides forming cutting edges, said apparatus comprising a frame, a grinding wheel supported by said frame for adjustment relative thereto, a pair of guides permanently secured to and carried by said frame and adapted to support said sickle in either of two alternative positions whereby when the sickle is mounted in one of said guides the beveled surface on one side of each knife section is positioned to be ground by the grinding wheel and when the sickle is mounted in the other of said guides the beveled surface on the opposite side of each knife section is positioned to be ground by the grinding wheel, said guides being so positioned angularly with respect to the frame that the beveled surface to be ground lies in a plane parallel to the plane of the grinding surface of the grinding wheel when said sickle is positioned in either of said guides, and the plane of the beveled surface to be ground with the sickle in one position coinciding with the plane of the beveled surface to be ground with the sickle in the other position, a gauge operable to determine the proper grinding position of the knife sections of the sickle when positioned in either of said guides, a locking member operable to lock the sickle in either of said guides, means for adjusting said grinding wheel relative to said frame for moving said grinding wheel longitudinally along the surface to be ground, and means for adjusting said grinding wheel relative to said frame for controlling the amount of cut of the grinding wheel.

8. A grinding apparatus for grinding sickles having a plurality of similar knife sections with forwardly converging beveled sides forming cutting edges, said apparatus comprising a supporting frame, means disposed in a perpendicular plane which intersects said supporting frame at an angle equal to the angle of bevel of said cutting edges, a pair of sickle guides carried by said means and disposed in the plane thereof, and a grinding tool supported for axial movement with respect to said supporting frame toward the plane of said sickle guides and for movement perpendicular to said supporting frame in a direction parallel with respect to said plane, said sickle guides being so disposed with respect to each other in said plane that with a sickle in either guide, the cutting edge to be ground lies in the plane of the face of said grinding tool.

9. A grinding apparatus for grinding sickles having a plurality of similar knife sections with forwardly converging beveled sides forming cutting edges, said apparatus comprising a supporting frame channel having flanges, a pair of uprights permanently secured to said flanges to lie in a plane disposed at an angle to the axis of said channel which is substantially equal to the angle of the bevel of said knife sections, a pair of fixed guides carried by said uprights to receive a sickle, the angle between said guides being substantially equal to the angle between the cutting edges of each section, a carriage supported for movement longitudinally of said frame channel, standard guides carried by said carriage and disposed at right angles with respect to the general plane of said frame channel, a standard supported in said guides for movement both perpendicularly and longitudinally of said frame channel, and a grinding tool carried by said standard.

10. A grinding apparatus for grinding sickles having a plurality of similar knife sections with forwardly converging beveled sides forming cutting edges, said apparatus comprising a supporting frame channel having flanges, a pair of uprights permanently secured to said flanges to lie in a plane disposed at an angle to the axis of said channel which is substantially equal to the angle of the bevel of said knife sections, a pair of fixed guides carried by said uprights to receive a sickle, the angle between said guides being substantially equal to the angle between the cutting edges of each section, a carriage supported for movement longitudinally of said frame channel, standard guides carried by said carriage and disposed at right angles with respect to the general plane of said frame channel, a standard supported in said guides for movement both perpendicularly and longitudinally of said frame channel, a grinding tool carried by said standard, and attaching means for said supporting frame comprising bracket means carried at one end of said supporting frame and a pair of brace members cooperating therewith and pivotally connected to the ends of said uprights.

11. A grinding apparatus for grinding sickles having a plurality of similar knife sections with forwardly converging beveled sides forming cutting edges, said apparatus comprising a supporting frame channel adapted to be supported in a generally horizontal position and including a pair of apertured transverse members rigidly secured thereto, a carriage supported for movement longitudinally of said supporting frame and comprising a pair of rods supported for sliding movement in the apertures of said transverse members and a pair of vertically disposed guides carried by said rods, a standard supported by said carriage for vertical movement along said guides in a direction perpendicular to the plane of said supporting frame channel and at right angles to the movement of said carriage relative to said frame channel, sickle supporting means carried by said frame channel, and a grinding tool supported at the upper end of said standard.

12. A grinding apparatus for grinding sickles having a plurality of similar knife sections with forwardly converging beveled sides forming cutting edges, said apparatus comprising a supporting frame channel adapted to be supported in a generally horizontal position and including a pair of apertured transverse members rigidly secured thereto, a carriage supported for movement longitudinally of said supporting frame and comprising a pair of rods supported for sliding movement in the apertures of said transverse members and a pair of vertically disposed guides carried by said rods, a standard supported by said carriage for vertical movement along said guides in a direction perpendicular to the plane of said supporting frame channel and at right angles to the movement of said carriage relative to said frame channel, sickle supporting means carried by and extending upwardly from said supporting frame channel and including a pair of angularly disposed vertically spaced sickle guides, and a grinding tool carried at the upper end of said standard and disposed generally in a position between said vertically spaced sickle guides, the grinding face of said tool being adapted to engage and grind the cutting edges of a sickle when the latter is disposed in the upper guide with the knife sections extending downwardly, and when the sickle is disposed in the lower guide with the knife sections extending upwardly.

13. A grinding apparatus for grinding sickles having a plurality of similar knife sections with forwardly converging beveled sides forming cutting edges, said apparatus comprising a supporting frame, means disposed in a perpendicular plane which intersects said supporting frame at an angle equal to the angle of bevel of said cutting edges, a pair of sickle guides carried by said means and disposed in the plane thereof, a grinding tool supported for axial movement with respect to said supporting frame toward the plane of said sickle guides and for movement perpendicular to said supporting frame in a direction parallel with respect to said plane, said sickle guides being so disposed with respect to each other in said plane that with a sickle in either guide, the cutting edge to be ground lies in the plane of the face of said grinding tool, and a clamp for locking the sickle in either of said guides, said clamp being so disposed as to engage and securely hold the particular knife section positioned to be ground by the grinding tool.

WALTER J. BORST.